S. H. MANCHESTER.
VEHICLE WHEEL.
APPLICATION FILED JUNE 6, 1921.

1,419,975.

Patented June 20, 1922.

Inventor
Seward H. Manchester
By He Hart
His Attorney

UNITED STATES PATENT OFFICE.

SEWARD H. MANCHESTER, OF WINSTED, CONNECTICUT.

VEHICLE WHEEL.

1,419,975.

Specification of Letters Patent. Patented June 20, 1922.

Application filed June 6, 1921. Serial No. 475,207.

*To all whom it may concern:*

Be it known that I, SEWARD H. MANCHESTER, a citizen of the United States, and resident of Winsted, county of Litchfield, State of Connecticut, have invented certain new and useful Improvements in Vehicle Wheels, of which the following is a specification.

The aim of the present invention is to provide in combination with the ordinary solid tired wheels of an automobile truck or the like, pneumatically tired wheels of greater diameter than the solid tired wheels, and means for detachably connecting the pneumatically tired wheels to the solid tired ones. With this arrangement, the ordinary solid tired wheels of a truck may be employed to carry the load when the truck is loaded, thus saving the more expensive pneumatic tires from excessive wear, and when the truck is running light, the pneumatically tired wheels may be quickly slipped in place and connected to the solid tired wheels to support the truck and make the truck easier riding and save it from rack and tear to which it would be subjected were it running on the solid tired wheels.

In the accompanying drawing.

Figure 1:
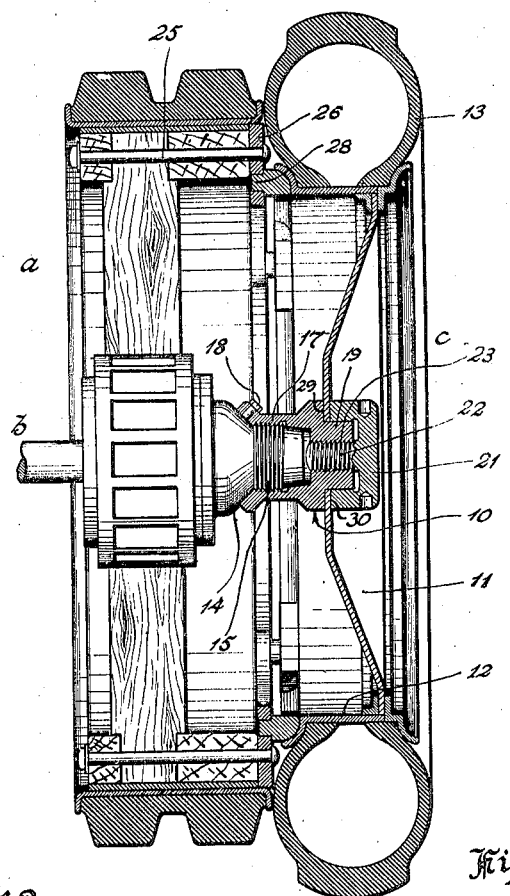
Fig. 1 is a sectional view showing the auxiliary or pneumatically tired wheel connected to the ordinary solid tired wheel of a truck.
Figure 2:
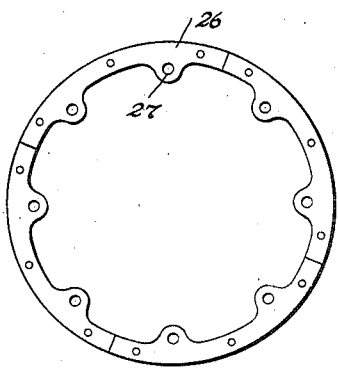
Fig. 2 is an outside view of the ring 26 which is connected to the solid tired wheel.
Figure 3:
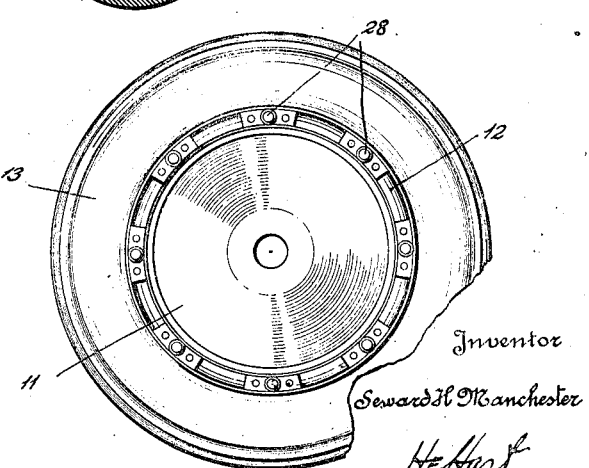
Fig. 3 is an inside view of the auxiliary or pneumatically tired wheel.

Referring to the drawings in detail, *a* denotes generally the solid tired wheel fixed to a driving axle or shaft *b*. This wheel may be of any suitable construction, that shown in the drawings being by way of illustration only. *c* denotes generally the auxiliary or pneumatically tired wheel which is here shown as having a hub 10, a web or disk 11, and a rim 12 carrying the pneumatic tire 13 which is of greater diameter than the solid tired wheel *a*.

The cap 14 of the wheel *a* is threaded as at 15 and the hub 10 of the auxiliary wheel is recessed and threaded as at 17, so that it may be screwed onto the cap 14. Accidental unscrewing of the hub 10 from the cap 14 is prevented by one or more set screws 18. The outer end of the hub 10 has a portion of reduced diameter which is received by a central opening in the disk or web 11. This web is clamped to the hub 10 by a recessed cap 21 surrounding the reduced portion 19 and having a threaded stud 22 screwed into a threaded axial recess or aperture 23 in the outer end of the hub 10. Fixed to the outer face of the felly of the solid tired wheel *a*, as by means of bolts 25, is a ring 26 having spaced openings 27 adapted to receive lugs 28 fixed to the rim 12 of the pneumatically tired wheel.

It will be seen that with this arrangement, when it is desired to use the auxiliary wheel *c*, as when the truck is running light on a return trip, it is merely necessary to slip the auxiliary wheel in place with the lugs 28 engaging in the openings 27 and reduced portion 19 of the auxiliary hub extending through the central opening in the web 11 and then screw home the cap 21 to clamp the inner edge of the web between the opposing abutments 29 and 30 provided on the hub 10 and cap 21 respectively. To detach the auxiliary wheels so that the truck, when loaded, may run on the solid tired ones, it is merely necessary to unscrew the cap 21 and slip the wheel from place without disconnecting the hub 10 from the cap 14 of the wheel *a*.

It is of course obvious that my invention is susceptible of various modifications and changes which are within the spirit of the invention without departing from the scope of the following claims; for instance, the ring 26 is shown as being in four parts but it may be of more or less parts than four; also, the construction of the auxiliary wheel may be other than that shown.

I claim as my invention:—

1. In combination with the usual solid tired wheel of a vehicle having a hub, of a pneumatically tired wheel of greater diameter than said solid tired wheel and having a web, a detachable hub portion, quickly detachable means for clamping said web to said hub portion, means for detachably connecting said hub portion to the hub of the usual wheel, and readily separable engaging means carried by the rims of said wheels.

2. The combination with the usual vehicle wheel having a hub provided with an externally threaded cap, of an auxiliary wheel having a web, a detachable hub portion, quickly removable means for clamping said web to said hub portion; said hub portion having an internally threaded recess adapted to receive said externally threaded cap, and means between said hub portion and cap for preventing unscrewing of said hub portion.

3. The combination with the usual vehicle wheel, of an auxiliary wheel provided with a web, a hub having a reduced end adapted to be received by the aperture in said web and a screw cap fitting about said reduced end and clamping said web to said hub; means for connecting said hub of the auxiliary wheel to the hub of said usual wheel, and quickly separable interengaging means between said wheels adjacent their peripheries.

4. The combination with the usual vehicle wheel, of a member secured to the felly thereof and provided with spaced openings, an auxiliary wheel provided with lugs fitting in said openings, and means for locking said wheel together.

SEWARD H. MANCHESTER.